Dec. 29, 3,551,029

Filed March 15, 1968  OF OPPOSITELY ORIENTED PRISMS  2 Sheets-Sheet 1

Kurt Kirchhoff
Inventor.

By Karl F. Ross
Attorney

United States Patent Office 3,551,029
Patented Dec. 29, 1970

3,551,029
ANAMORPHOTIC COMPONENT WITH TWO PAIRS OF OPPOSITELY ORIENTED PRISMS
Kurt Kirchhoff, Hamburg-Lurup, Germany, assignor to ISCO Optische Werke G.m.b.H., Gottingen, Germany, a corporation of Germany
Filed Mar. 15, 1968, Ser. No. 713,375
Claims priority, application Germany, Mar. 25, 1967, J 33,297
Int. Cl. G02b 13/12, 15/14
U.S. Cl. 350—182                                 6 Claims

ABSTRACT OF THE DISCLOSURE

Objective componens with adjustable magnification ratios in vertical and horizontal axial planes, also useful as a varifocal orthomorphotic component, for camera or projector, with two pairs of oppositely oriented prisms respectively swingable in the horizontal and the vertical plane and inserted between two spherically effective components.

---

My present invention relates to an optical objective for photographic or cinematographic cameras or projectors, more particularly to an afocal component of or attachment for such objective adapted to vary the relative magnification ratio in two orthogonally related axial planes. For convenience, these planes will be referred to hereinafter as "horizontal" and "vertical" even though, of course, their absolute orientation is spaced may be altered.

It is known, e.g. from U.S. Pat. No. 2,828,670, to construct such an afocal component from two oppositely rotatable prisms which, according to their position, increase or reduce the image scale in their plane of swing. Also known from this patent is the use of two crossed prism pairs to provide a varifocal or zoom-type objective system.

Although a single prism pair suffices for expansion and contraction, difficulties are encountered in such wide-angle projection systems as "Cinemascope" or the like with anamorphotic ratios approaching the magnitude of 2:1 since the light rays then impinge upon the prism with an angle of incidence close to the critical angle, thereby resulting in considerable distortion.

An important object of my invention is to provide an anamorphotic objective system of this general type which avoids the aforestated drawback.

A more particular object is to provide an afocal component of this general description which can be used with minimum distortion both as an anamorphoser, giving an anamorphotic ratio of about 2:1, and as the equivalent of a varifocal element or zoom lens for orthomorphotic imaging with adjustable magnification, the varifocal ratio being likewise on the order of 2:1.

These objects are realized, pursuant to my present invention, by the combination of a spherically effective objective with an afocal component consisting of two pairs of oppositely oriented prisms respectively swingable in a first ("horizontal") and a second ("vertical") plane whereby an expansion of the image scale in one plane can be accompanied by a contraction in the other plane, or vice versa, the system also enabling concurrent contraction or expansion in both planes to create a varifocal effect. Each of these prisms consists of two outer wedges with a relative low refractive index $n'$ and an oppositely pointing inner wedge with a relatively high refractive index $n''$, the vertex angles of these wedges and the indices $n'$, $n''$ being preferably the same for all prisms. Furthermore, the outer wedges may have the same vertex angle $\alpha'$ which may be slightly greater than the intervening vertex angle $\alpha''$, the three vertex angles together preferably adding up to approximately 45°. In a system according to the invention having particularly good optical qualities, the vertex angle $\alpha'$ and $\alpha''$ lie substantially between 15° and 18° and between 10° and 13°, respectively, with index $n'$ lying in the range of about 1.47 to 1.58 and with index $n''$ ranging approximately from 1.67 to 1.78, the corresponding disperison ratios or Abbé numbers $\nu'$, $\nu''$ being preferably chosen in the ranges of substantially 45 to 65 and 24 to 34, respectively.

Thus, by using one pair of prisms to increase the image scale by a factor of $\sqrt{2}$ and the other pair to reduce the image scale by the same factor, the overall anamorphotic ratio will be made equal to 2 without an excessive swing of either pair of prisms. This distribution of the anamorphotic effect entails a reduction of the distortion factor to a magnitude of about 5 to 10%. Larger anamorphotic ratios can also be realized, advantageoussly by increasing the contraction in the vertical plane where (especially in the case of motion-picture films) the field angle is generally smaller than in the horizontal plane.

Particularly where the afocal component is to be used also as an orthomorphotic element of adjustable magnification ratio, the two pairs of prisms are advantageously designed with identical angles and refractive indices as well as disperison ratios. It will also be convenient to make the two oppositely oriented prisms of each pair geometrically similar to each other so that, in fact, all four prisms can have the same basic structure while possibly differing only in their overall size.

Apart from the spherically effective basic objective with the two prism pairs according to the invention are permanently or detachably associated as a forward component, the present system may also include a spherically effective front lens, or combination of lenses, adjustably to vary the overall focal length. Since the presence of the prisms causes a horizontal and a vertical shift of the optical axis, this spherically effective front component will generally not be voaxial with the associated basic objective.

The pivotal displacement of the several prisms may be carried out by hand or automatically. If these movements are not mechanically co-ordinated, the prisms may be provided with correspondingly marked indexed positions to establish a limited number of operating positions for the overall system.

The invention will be described in a greater detail hereinafter with reference to the accompanying drawing in which.

Figure 1:
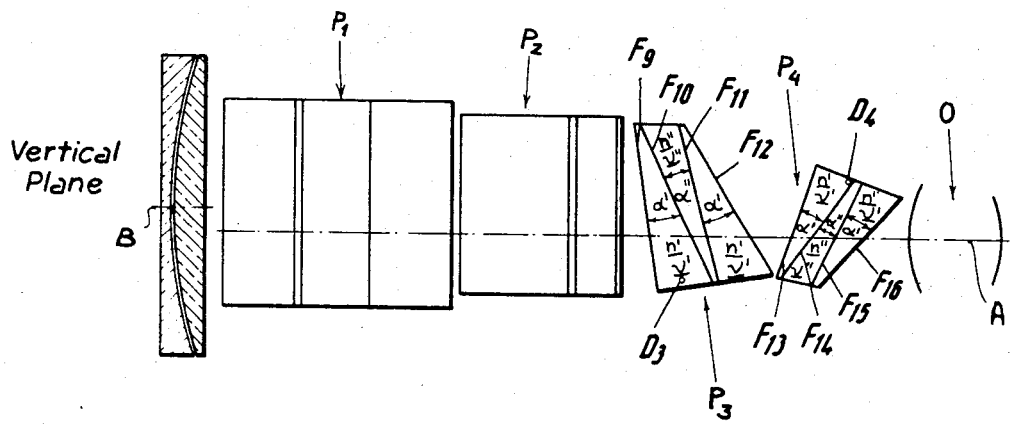
FIG. 1 is a view, partly in section, of an objective system according to the invention as seen in a vertical plane.

The optical system shown in the drawing compries a basic objective O of one or more lenses, not illustrated in detail, having a horizontal axis A. A pair of spherical lenses $L_1$, $L_2$ of respectively planoconcave and planoconvex configuration and approximately equal absolute power, centered on an axis B parallel to axis A, are separated by a narrow air gap and form a substantilly afocal group adapted, by their relative axial displacement, to vary the overall focal length of the system and, therefore, the back-focal length of the basic objective O. Thus, either or both of these lenses $L_1$, $L_2$ may be axially displaceable for focusing purposes.

Between the front group $L_1$, $L_2$ and the basic objective there are disposed, in accordance with my present invention, two pairs of mutually oppositely oriented prisms $P_1$, $P_2$ and $P_3$, $P_4$. Prisms $P_1$ and $P_2$ are swingable in a horizontal plane, including the axis A, about respective pivots $D_1$, $D_2$; prisms $P_3$ and $P_4$ are similarly swingable, in a vertical plane through axis A, about respective pivots $D_3$ and $D_4$.

Each prism is designed as a triplet consisting of two outer wedges and an inner wedge whose boundaries are flat surfaces $F_1$–$F_4$ in the case of prisms $P_1$, $F_5$–$F_8$ in the case of prisms $P_2$, $F_9$–$F_{12}$ in the case of prisms $P_3$ and $F_{13}$–$F_{16}$ in the case of prism $P_4$. The outer wedges $F_1$–$F_2$ and $F_3$–$F_4$ of prism $P_1$, and corresponding wedges of each other prism, are made of glass with a refractive index (for the yellow $d$-line of the spectrum) $n'=1.52458$ and a dispersion ratio $v'=59.2$, their vertex angles $\alpha'$ being equal to 16.5°. The inner wedges $F_2$–$F_3$, $F_6$–$F_7$, $F_{10}$–$F_{11}$ and $F_{14}$–$F_{15}$ of each prism has a vertex angle $\alpha''=11.4°$, a refractive index $n''=1.72734$ and a dispersion ratio $v''=29.0$. These values, of course, are merely illustrative of a preferred set of parameters within the framework of the present invention.

Figure 2:
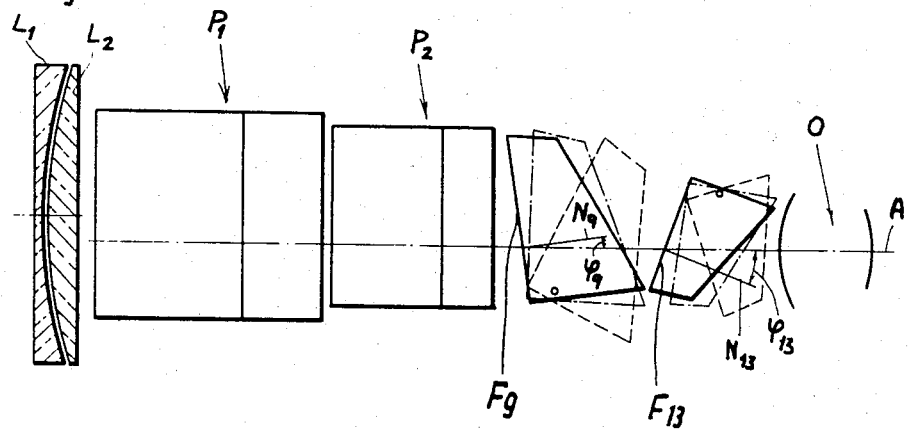
FIGS. 2 and 2a are views similar to FIGS. 1 and 1a, respectively, showing three positions of adjustment in full, dashed or dot-dashed lines, respectively.
Figure 2A:
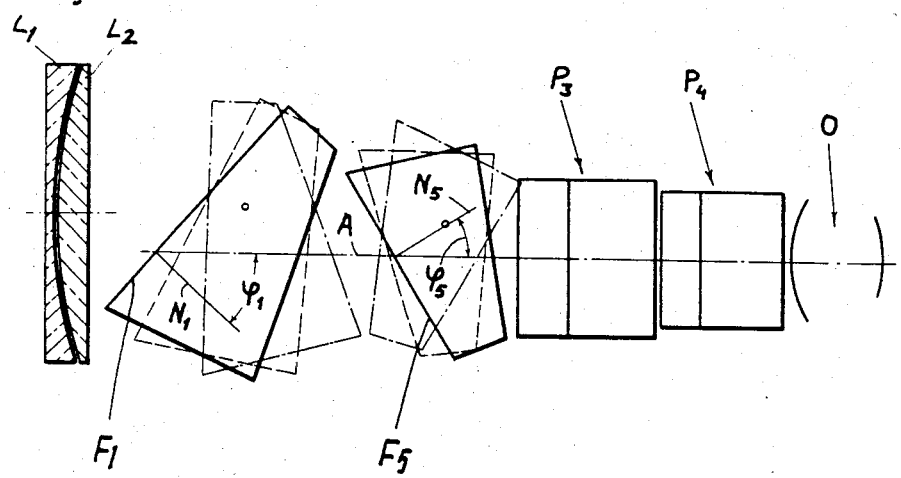

The angular position of each prism can be measured in terms of the angle $\varphi_1$, $\varphi_5$, $\varphi_9$ or $\varphi_{13}$ included between the axis A and the surface normal $N_1$, $N_5$, $N_9$ or $N_{13}$ of its respective front face $F_1$, $F_5$, $F_9$ or $F_{13}$, or from corresponding angles of other prism surfaces which can be readily calculated from the data given above. The following table lists the values of these angles in three different possitions I, II and III, respectively illustrated in full, dashed and dot-dashed lines in FIGS. 2 and 2a, together with the magnification ratios $R_v$ and $R_h$ in the vertical and the horizontal plane, respectively.

TABLE 1

| | $\varphi_1$, degrees | $\varphi_5$, degrees | $\varphi_9$, degrees | $\varphi_{13}$, degrees | $R_h$ | $R_v$ |
|---|---|---|---|---|---|---|
| I | −42.5 | +31.3 | +9.7 | −20.9 | 1:0.7 | 1:1.4 |
| II | −29.2 | +19.5 | −29.2 | +19.5 | 1:0.869 | 1:0.869 |
| III | −0.35 | −9.50 | −0.35 | −9.50 | 1:1.186 | 1:1.186 |

The foregoing table gives one anamorphotic position (I), with an anamorphotic factor $R_h/R_v=2$, and two orthomorphotic positions (II and III) in which prism $P_1$ is parallel to prism $P_3$ and prism $P_2$ is parallel to prism $P_4$. As will be understood by persons skilled in the art, the positions of rear prisms $P_2$ and $P_4$ are to be always complementary to those of front prisms $P_1$ and $P_3$ in the sense that any axially incident ray striking the front prism emerges from the rear prism in a direction parallel to the axis; from the laws of refraction, for any prisms of given shape and refractivity, the angle of deviation may be readily tabulated for all angles of incidence so that, for any intermediate front-prism positions not listed on the above table, the corresponding rear-prism position can be unequivocally determined.

Whereas in positions II and III the prisms $P_1$ and $P_2$ are respectively parallel to prisms $P_3$ and $P_4$, position I is characterized by the fact that all surfaces ($F_1$, $F_2$, $F_3$, $F_4$) of prism $P_1$ have the same axial inclination as respective surfaces ($F_{16}$, $F_{15}$, $F_{14}$, $F_{13}$) of prism $P_4$ and that a similar parallelism exists between prisms $P_2$ and $P_3$; therefore, the 16 surfaces $F_1$–$F_{16}$ of the system form eight parallel pairs.

Figure 1A:
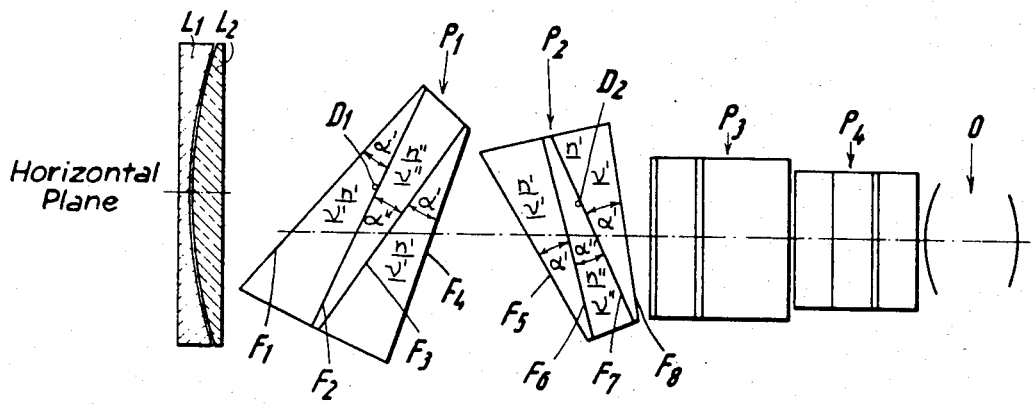
FIG. 1a is a view of the same system in a horizontal plane.

In position I, in which the system has an apparent overall focal length of 0.7 linear units in the horizontal plane and of 1.4 linear units in the vertical plane (thus, of 35 and 70 mm., respectively, if the basic objective has a focal length of 50 mm.), the projected picture will fit on a screen having a height-to-width ratio of 1:2.35, which corresponds to the wide Cinemascope screen. In position II, the apparent focal length in either plane is 0.869 linear unit, or 43.45 mm. in the special case assumed, whereas in position III the apparent focal length is 1.186 linear units, or 59.3 mm. Another position of orthomorphotic adjustment, with prisms $P_1$, $P_2$ in position I and prisms $P_3$, $P_4$ in a position parallel thereto, yields an apparent focal length of 0.7 unit in either plane; similarly, with both prism pairs turned into a position corresponding to that of prisms $P_3$, $P_4$ in position I, this apparent focal length will have the value of 1.4 units. Obviously, it will also be possible to interchange the positions of the two prism pairs illustrated in FIGS. 1 and 1a and, thereby, the horizontal and vertical magnification ratios if, for any reason, anamorphotic contraction or expansion should be desired in the vertical rather than the horizontal plane.

I claim:
1. An anamorphotic optical system comprising a spherically effective component and an afocal component, the latter consisting of a first and a second prism complementarily positioned in a first plane including the axis of said spherically effective component, and of a third and a fourth prism complementarily positioned in a second plane including said axis and lying at right angles to said first plane, said prisms being all geometrically similar and optically identical triplets each composed of two outer wedges of identical vertex angle with a refracting index of about 1.5 and an inner wedge with a refractive index of about 1.7, the vertex angle of said outer wedges ranging between substantially 15° and 18°, the vertex angle of said inner wedge ranging between substantially 10° and 13°, said first and second prisms having front surfaces inclined to said axis at substantially the same angle as the rear surfaces of said fourth and third prisms, respectively, the magnification ratio of said first and second prisms in said first plane being substantially equal to $\sqrt{2}:1$, the magnification ratio of said third and fourth prisms in said second plane being substantially equal to $1:\sqrt{2}$.

2. The combination defined in claim 1 wherein said spherically effective component is a basic objective disposed rearwardly of said pairs of prisms, further comprising spherically effective lens means in front of said pairs, said lens means being axially adjustable for varying the overall focal length of the system.

3. The combination defined in claim 2 wherein said lens means comprises an approximately afocal pair of lenses of opposite refractivity.

4. A system as defined in claim 1 wherein said outer wedges have a vertex angle of substantially 16.5° and a dispersion ratio of substantially 59, said inner wedge having a vertex angle of substantially 11.4° and a dispersion ratio of substantially 29.

5. A system as defined in claim 1 wherein said outer wedges have a vertex angle of substantially 16.5°, said inner wedge having a vertex angle of substantially 11.4°.

6. A system as defined in claim 1 wherein said outer wedges have a dispersion ratio of substantially 59, said inner wedge having a dispersion ratio of substantially 29.

References Cited

UNITED STATES PATENTS

| | | | |
|---|---|---|---|
| 2,780,141 | 2/1957 | Luboshez | 350—185 |
| 2,798,411 | 7/1957 | Coleman | 350—185 |
| 2,821,111 | 1/1958 | Coleman | 350—182 |
| 2,828,670 | 4/1958 | Luboshez | 350—185 |

DAVID SCHONBERG, Primary Examiner

P. A. SACHER, Assistant Examiner

U.S. Cl. X.R.

350—185